US012792195B2

(12) United States Patent
Xu

(10) Patent No.: US 12,792,195 B2
(45) Date of Patent: Nov. 10, 2026

(54) METHOD AND APPARATUS FOR POSTING GROUP VOTING AND RELATED PRODUCT

(71) Applicant: TENCENT TECHNOLOGY (SHENZHEN) COMPANY LIMITED, Shenzhen (CN)

(72) Inventor: Qiaoyun Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 310 days.

(21) Appl. No.: 18/597,256

(22) Filed: Mar. 6, 2024

(65) Prior Publication Data

US 2024/0211107 A1 Jun. 27, 2024

Related U.S. Application Data

(63) Continuation of application No. PCT/CN2023/086078, filed on Apr. 4, 2023.

(30) Foreign Application Priority Data

Aug. 5, 2022 (CN) ........................ 202210958212.5

(51) Int. Cl.
*G06F 3/0482* (2013.01)
*G06F 40/166* (2020.01)
(Continued)

(52) U.S. Cl.
CPC .......... *G06F 3/0482* (2013.01); *G06F 40/166* (2020.01); *H04L 51/046* (2013.01);
(Continued)

(58) Field of Classification Search
CPC ................................................ G06F 3/048–05
See application file for complete search history.

(56) References Cited

U.S. PATENT DOCUMENTS 7,606,706 B1 * 10/2009 Rubin .................... H04L 51/04
704/235
11,494,440 B1 * 11/2022 Black ...................... G06F 40/35
(Continued)

FOREIGN PATENT DOCUMENTS

CN 106664240 A 5/2017
CN 107025713 A 8/2017
(Continued)

OTHER PUBLICATIONS

International Search Report for PCT/CN2023/086078 dated Jul. 10, 2023.

(Continued)

*Primary Examiner* — Daniel Rodriguez
(74) *Attorney, Agent, or Firm* — Sughrue Mion, PLLC

(57) ABSTRACT

A method and an apparatus for posting a group voting and a related product. The method includes displaying a session list based on a trigger operation on a voting entrance in a document editing tool, displaying a chat window of a target group session based on the determined target group session in the session list, obtaining a plurality of to-be-parsed group session messages in the chat window, and generating a voting option based on the group session message, and posting a group voting comprising the voting option through the document editing tool.

20 Claims, 12 Drawing Sheets

(51) Int. Cl.
*H04L 51/046* (2022.01)
*H04L 51/18* (2022.01)
*H04L 51/216* (2022.01)
*H04L 51/52* (2022.01)

(52) U.S. Cl.
CPC ............ *H04L 51/18* (2013.01); *H04L 51/216* (2022.05); *H04L 51/52* (2022.05)

(56) References Cited

U.S. PATENT DOCUMENTS

| | | | | |
|---|---|---|---|---|
| 11,694,279 | B1* | 7/2023 | Dominici | G06F 16/29 455/414.2 |
| 2012/0077469 | A1* | 3/2012 | Bhogal | H04L 51/216 455/414.1 |
| 2012/0110429 | A1* | 5/2012 | Tzonis | G06Q 10/10 715/256 |
| 2012/0117463 | A1* | 5/2012 | Inglis | G06F 40/58 715/255 |
| 2013/0346887 | A1* | 12/2013 | Damis | H04L 51/046 715/758 |
| 2014/0026074 | A1* | 1/2014 | Cortes | H04M 3/567 715/753 |
| 2014/0267081 | A1* | 9/2014 | Kreek | G06F 3/011 345/173 |
| 2015/0302103 | A1* | 10/2015 | Jeremias | G06F 16/9535 715/758 |
| 2016/0034162 | A1* | 2/2016 | Atamel | H04L 51/046 715/752 |
| 2016/0188125 | A1* | 6/2016 | Kaplan | G06F 3/0481 715/730 |
| 2017/0063745 | A1* | 3/2017 | Banerjee | G06Q 30/0203 |
| 2017/0220546 | A1* | 8/2017 | Codrington | G06F 16/2282 |
| 2019/0068477 | A1* | 2/2019 | Faulkner | G06Q 10/101 |
| 2020/0125632 | A1* | 4/2020 | Ning | H04L 51/04 |
| 2020/0371663 | A1* | 11/2020 | Rubinstein | G06F 3/04812 |
| 2022/0113847 | A1* | 4/2022 | Hong | G06F 16/957 |
| 2022/0245338 | A1* | 8/2022 | Yoo | G06F 16/24578 |
| 2023/0244857 | A1* | 8/2023 | Weiss | G06F 40/169 715/230 |

FOREIGN PATENT DOCUMENTS

| | | | |
|---|---|---|---|
| CN | 110264163 | A | 9/2019 |
| CN | 110634220 | A | 12/2019 |
| CN | 114035729 | A | 2/2022 |

OTHER PUBLICATIONS

Written Opinion for PCT/CN2023/086078 dated Jul. 10, 2023.

Office Action dated Apr. 30, 2026 in Chinese Application No. 202210958212.5.

* cited by examiner

METHOD AND APPARATUS FOR POSTING GROUP VOTING AND RELATED PRODUCT

CROSS-REFERENCE TO RELATED APPLICATIONS

This application is a continuation application of International Application No. PCT/CN2023/086078 filed Apr. 4, 2023, which claims priority to Chinese Patent Application No. 202210958212.5, filed with the China National Intellectual Property Administration on Aug. 5, 2022, the disclosures of each being incorporated by reference herein in their entireties.

FIELD

The disclosure relates to the field of data processing technologies, and in particular, to posting a group voting.

BACKGROUND

In some communication software, a group session mechanism is set up. A group session enables a plurality of people to communicate with each other, which is helpful to improve communication efficiency. Since a group has a large number of members, to solicit broader opinions from the members of the group when a decision needs to be made, voting can often be initiated so that all members of the group can express opinions.

In the related art, to post a group voting, an initiator often needs to manually edit a voting page and then post it. For example, a group voting initiator needs to organize a group session and complete a statistical summary of opinions, then determine a voting option and then fill in an editing page. Messages in the group are often a variety of rich texts, for example, not only including a text that can be read directly, but also including a picture, a video, and even a web page link. The group voting creator needs to spend a lot of time on tedious manual operations to collate these messages and statistically summarize people's opinions. Taking a picture as an example, the group voting creator needs to download the picture first before reading information in the picture. Taking a web page link as an example, the group voting creator needs to jump to an opened web page through the link, and then performs operations such as copying a text in the web page. It is not difficult to find that such a method for posting a group voting is inefficient.

SUMMARY

Some embodiments provide a method and an apparatus for posting a group voting, and a related product, aiming to improve the efficiency of posting a group voting and reduce complex editing operations for a voting creator.

Some embodiments provide a method for posting a group voting, including: displaying a session list based on a trigger operation on a voting entrance in a document editing tool; displaying a chat window of a target group session based on the determined target group session in the session list; obtaining a plurality of to-be-parsed group session messages in the chat window; and generating a voting option based on the group session message, and posting a group voting including the voting option through the document editing tool.

Some embodiments provide an apparatus for posting a group voting, and the apparatus includes: at least one memory configured to store program code; and at least one processor configured to read the program code and operate as instructed by the program code, the program code comprising: session list display code configured to cause at least one of the at least one processor to display a session list based on a trigger operation on a voting entrance in a document editing tool; chat window display code configured to cause at least one of the at least one processor to display a chat window of a target group session based on the determined target group session in the session list; message obtaining code configured to cause at least one of the at least one processor to obtain a plurality of to-be-parsed group session messages in the chat window; voting option generation code configured to cause at least one of the at least one processor to generate a voting option based on the group session message; and voting posting code configured to cause at least one of the at least one processor to post a group voting including the voting option through the document editing tool.

Some embodiments provide a non-transitory computer-readable storage medium storing computer code which, when executed by at least one processor, causes the at least one processor to at least: display a session list based on a trigger operation on a voting entrance in a document editing tool; display a chat window of a target group session based on the determined target group session in the session list; obtain a plurality of to-be-parsed group session messages in the chat window; and generate a voting option based on the group session message, and post a group voting comprising the voting option through the document editing tool.

Some embodiments provide a method for posting a group voting. In this method, a voting entrance is provided in a document editing tool, so that a user can trigger a process of initiating a group voting. After the voting entrance is triggered, a session list is displayed for the user to determine a target group session. The target group session provides a material to generate a voting option. After the target group session is determined, a chat window of the group session is displayed. From the chat window, a plurality of to-be-parsed group session messages may be obtained and the messages are parsed to generate the voting option, and then the group voting is posted through the document editing tool. The method for posting a group voting provided in the embodiments can automatically parse the group session messages to generate the voting option, and can replace a process of manually sorting messages and summarizing people's intentions, realizing automatic filling in of the option, and avoiding complex and cumbersome operations such as editing the voting option, thereby improving the efficiency of posting the group voting. In addition, the document editing tool provides a trigger mechanism for the voting entrance, making voting very convenient to initiate and easy to implement, and providing a better user experience.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
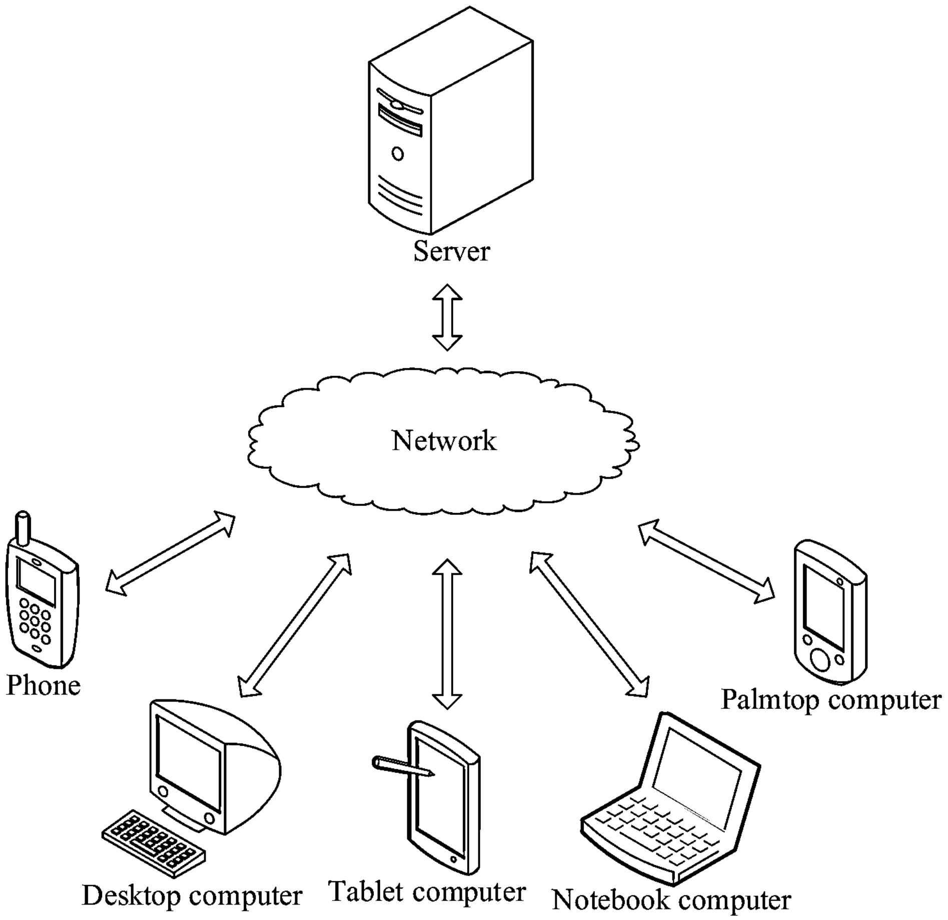
FIG. 1 is a diagram of a scenario architecture of a method for posting a group voting according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the following descriptions, related “some embodiments” describe a subset of all possible embodiments. However, it may be understood that the “some embodiments” may be the same subset or different subsets of all the possible embodiments, and may be combined with each other without conflict. As used herein, each of such phrases as “A or B,” “at least one of A and B,” “at least one of A or B,” “A, B, or C,” “at least one of A, B, and C,” and “at least one of A, B, or C,” may include all possible combinations of the items enumerated together in a corresponding one of the phrases. For example, the phrase “at least one of A, B, and C” includes within its scope “only A”, “only B”, “only C”, “A and B”, “B and C”, “A and C” and “all of A, B, and C.”

First, several terms that may be involved in various embodiments are explained.

Group voting: “Voting” is a method of group decision-making. The “group voting” mentioned in this application refers to an application that posts a voting content to a designated group session and allows group members to complete the voting within a designated time, the system automatically calculates a voting result, and the group decision-making is completed.

Creator: The creator specifically refers to “a user who initiates the group voting”. A basic task flow of this user role is “post a voting-edit the voting-end the voting and publish a voting result”.

Collaborator: The collaborator refers to “a group member user who participates in a voting”.

Link parsing: “Link parsing” refers to grabbing a web page title, a description, and a picture through a hypertext markup language HTML.

Image understanding: “Image understanding” refers to the semantic understanding of a computer for an image. Based on artificial intelligence technologies such as deep learning and massive training data, the image is analyzed to understand “what it is” and “what scenario it is in”, and is used for parsing a scenario, an object, a character, and an animal in the image.

Image tag: Based on image understanding, images are intelligently classified and object recognized, and image tags are assigned through classification and recognition. For example, a picture of “spicy chicken” is labeled with “food”, “Sichuan cuisine”, “chili”, and the like.

Intelligence filling: “Intelligence filling” refers to the application of technology that automatically fills in a voting title, a voting description, and an option. The link parsing and the image understanding technology are used to analyze a group session and automatically fill an option text or an image field for the voting. In addition, a voting title is intelligently filled based on the image and text semantics included in the voting option.

In view of a fact that the current posted group voting generally requires the creator of the voting to manually interpret the intentions of the group members and perform a series of tedious editing operations, resulting in a problem of a complex method for posting a group voting and low posting efficiency, some embodiments provide a method for posting a group voting and a related product. In some embodiments, it is only necessary to determine to-be-parsed group session messages, trigger parsing on the to-be-parsed group session messages, and then a voting option is generated based on these group session messages and a group voting is posted. There is no need to manually interpret intentions of the group members and edit the voting option. After the group session messages are parsed, the voting option may be accurately generated, reducing tedious manual operations and making the posting of a group voting simpler, more convenient, and easier for people to implement. The entire process is more efficient and time-saving than previous technologies. The document editing tool also provides a path to efficiently initiate a group voting.

The method for posting a group voting provided in some embodiments may be performed by a terminal device. For example, an application program client of instant messaging software may be run on the terminal device. Through the application program client of the instant messaging software, a user can initiate a group session. The group session may be held by opening the chat window of the session. Take the chat window of a target group session as an example. When the user needs to initiate a voting, some group session messages in the session window may be selected through touch operations on a screen of the terminal device or through an external device such as a mouse and a keyboard, and the terminal device may determine based on the selected group session messages that they are to-be-parsed group session messages. The parsing of the group session messages may be completed by the terminal device, or may be parsed by other devices. For example, the terminal device may initiate a parsing request to a server in which an application program server of the communication software is installed, and the server parses the to-be-parsed group session messages. The terminal device then receives a parsing result of the group session messages from the server. The terminal device may intelligently fill parsed option information into a voting editing page to generate a voting option, replacing the manual editing of the voting option by a voting creator. Finally, the user only needs to apply a trigger operation on a posting control on the voting editing page, and the software client running on the terminal device may post the group voting including the foregoing generated voting option in the target group session window for other members of the group to express voting opinions, and ultimately decision-making of multiple members in the group is realized.

In addition, the method for posting a group voting provided in some embodiments may be performed by other devices, such as a server. Therefore, in some embodiments, there is no limitation on an implementation body that implements technical solutions. As mentioned above, the method for posting a group voting provided in some embodiments may be implemented jointly by a terminal device and a server. FIG. 1 is a diagram of a scenario architecture of a method for posting a group voting according to some embodiments. In the scenario shown in FIG. 1, a terminal device is responsible for interacting directly with a user and requesting a server to parse group session messages. The server is responsible for parsing the group session messages and feeding them back to the terminal device. The server provides a background technical support for the method for posting a group voting introduced above. The initiation and the posting of the group voting are displayed on the terminal device. The terminal device includes, but is not limited to, any one of the following forms: a mobile phone, a desktop computer, a tablet computer, a notebook computer, a palmtop computer, or the like. The server shown in FIG. 1 may be an independent physical server, or may be a server cluster including a plurality of physical servers or a distributed system. In addition, the server may further be a cloud server for providing basic cloud computing services such as a cloud service, a cloud database, cloud computing, a cloud function, cloud storage, a network service, cloud communication, a middleware service, a domain name service, a security service, a CDN, and a big data and artificial intelligence platform.

It can be understood that in some embodiments, related data such as group session messages are involved, when the foregoing embodiments are applied to specific products or technologies, any piece of data requires user permission or consent separately, and the collection, use, and processing of relevant data need to comply with the relevant laws, regulations, and standards of relevant countries and regions.

Figure 2A:
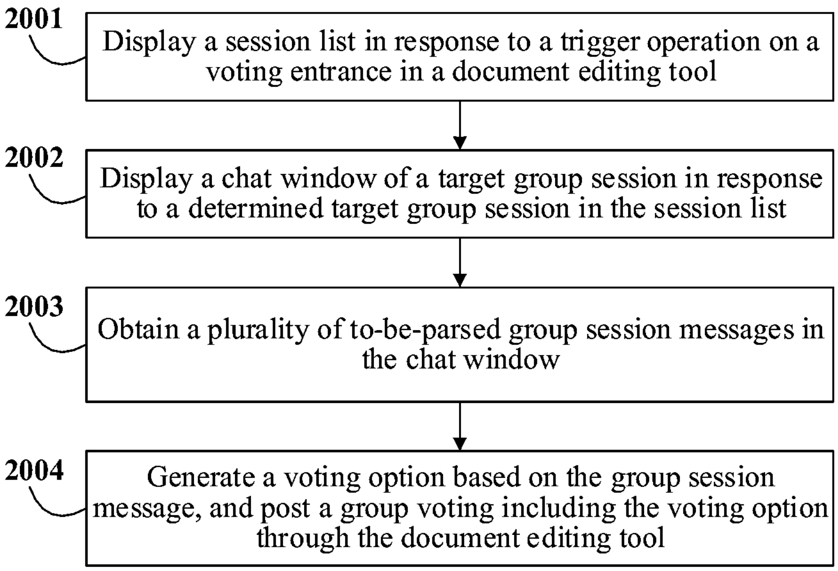
FIG. 2A is a flowchart of a method for posting a group voting according to some embodiments.
Figure 2B:
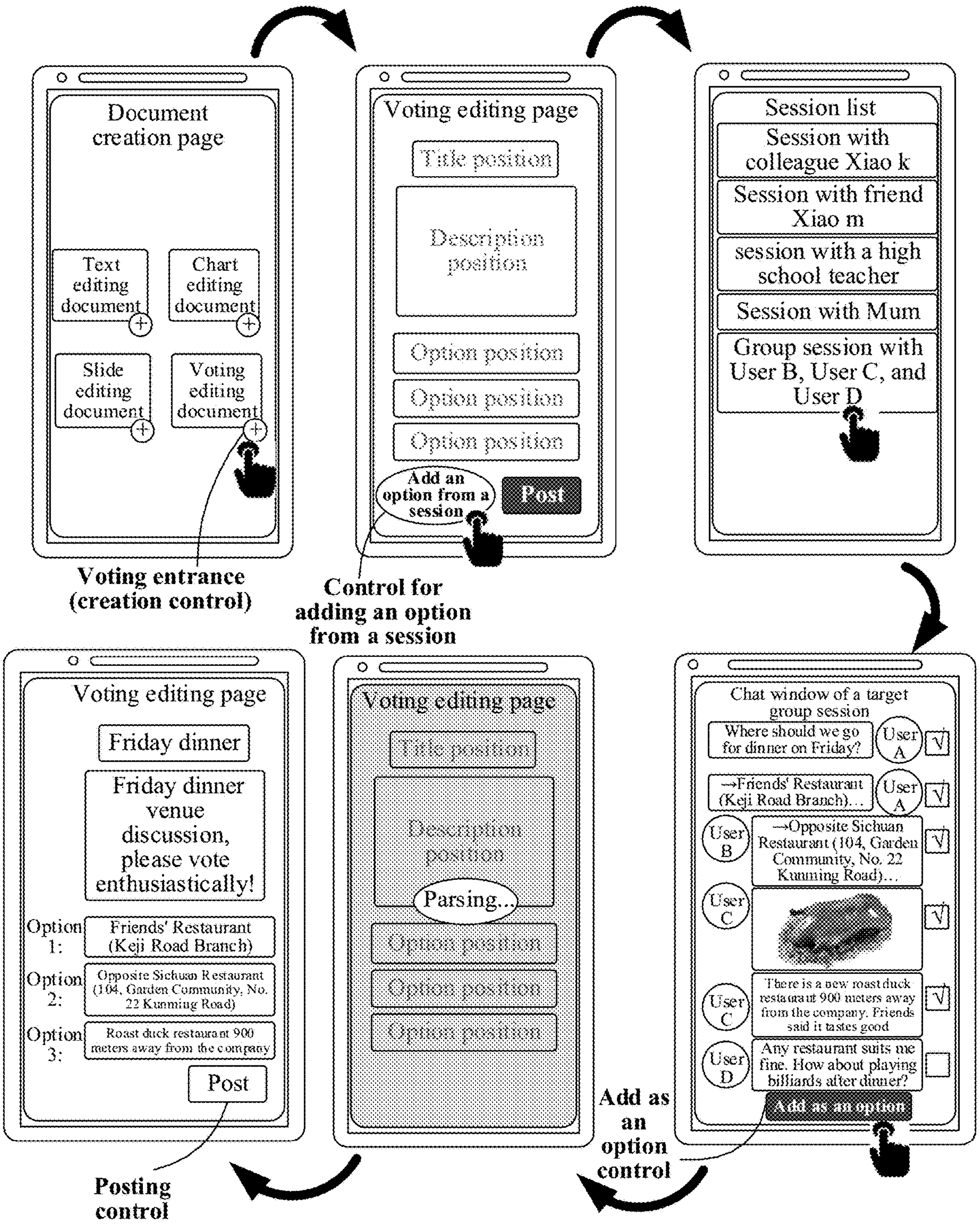
FIG. 2B is an interface view of posting a group voting on a terminal device corresponding to FIG. 2A.

As mentioned above, some embodiments may be performed by a computer device, such as the foregoing terminal device or server. For ease of understanding, the following takes an example in which the terminal device is used as the computer device and the terminal device is used as an execution body to describe the implementation of the method. FIG. 2A is a flowchart of a method for posting a group voting according to some embodiments. This method specifically introduces a path to initiate and post a group voting from a document editing tool. This path may also be learned from an interface view of posting a group voting on a terminal device shown in FIG. 2B corresponding to FIG. 2A. The path involves the following processes: A creator enters a document editing tool and creates a new blank voting in the document editing tool, and then the page jumps to a session list; the creator selects a target group session window from the session list and selects a group session message; and add the selected message as an option in the session window to parse the message and actually generate a voting option, and ultimately post the group voting.

First, the method flow is introduced. The method for posting a group voting shown in FIG. 2A includes:

Operation 2001. Display a session list in response to a trigger operation on a voting entrance in a document editing tool.

In some embodiments, to generate a voting option, a window including group session messages needs to be presented for the creator of the group voting to select messages. In the path for posting the group voting provided in this embodiment, the group voting is not triggered and initiated from the chat window of the group session, but is initiated from the document editing tool.

In some embodiments, a variety of documents may be created in the document editing tool, such as a text editing document, a chart editing document, a slide editing document, a voting editing documents, and the like. After the document editing tool is opened, a document creation page is displayed. A creation control for the foregoing documents is displayed on the document creation page. The creation control of the voting editing document is used as the voting entrance.

The document editing tool may be an independent application program, a small program opened in the instant messaging software, or a tool that exists in other manners. There is no limitation on the form and the nature of the document editing tool herein. The document editing tool provides the voting entrance. Due to the provision of the voting entrance, once the creator triggers the voting entrance, the creator may see the session list displayed on the terminal device for the creator to select the group session.

In some embodiments, operation 2001 may include:

creating and displaying a voting editing page in response to the trigger operation on the voting entrance. Information in the voting editing page may be used as a voting parameter setting item. That is, the voting editing page includes the voting parameter setting item. In some embodiments, the voting parameter setting item includes a voting option, a voting deadline, a voting description, a voting title, and the like, and may further include a control for adding an option from the session. In this operation, based on the displayed page, the session list is displayed in response to a trigger operation on a control for adding an option from a session in the voting parameter setting item.

Operation 2002. Display a chat window of a target group session in response to a determined target group session in the session list.

As mentioned above, by triggering the voting entrance in the document editing tool, the session list of the creator of the instant messaging software is displayed. The session list includes sessions in the communication software that have not been cleared by the creator. Some of these sessions may be one-to-one sessions, and some may be group sessions that occur among multiple people. The creator may select a group session as a target group session. The target group session is a message parsing source of the group voting.

Operation 2003. Obtain a plurality of to-be-parsed group session messages in the chat window.

Figure 3:
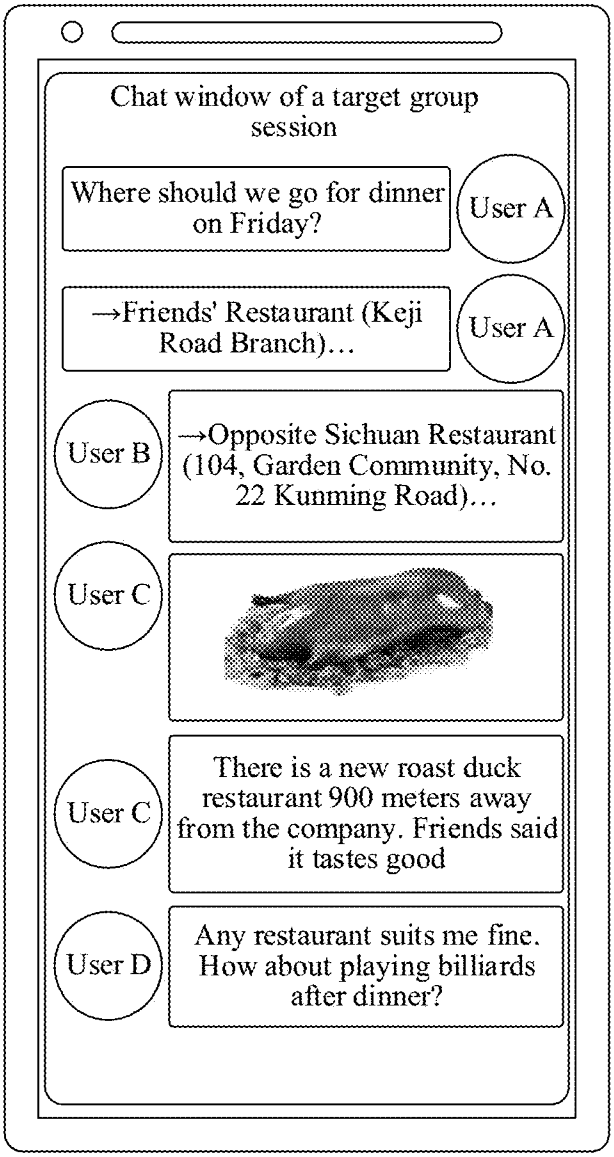
FIG. 3 is a schematic diagram of a target group session window according to some embodiments.

Before the method in this embodiment is performed, several group session messages have been generated in the target group session window. These group session messages may be transmitted by different members of the group. For example, the members included in the target group session window are: a user A, a user B, a user C, and a user D. The user A is used as the creator of the group voting, and other users in the group including the user B, the user C, and the user D are used as collaborators of the group voting. FIG. 3 is a schematic diagram of a target group session window according to some embodiments. In the session window shown in FIG. 3, the user A asks "Where should we go for dinner on Friday?", and based on this, a web page link about "Friends' Restaurant (Keji Road Branch)" is transmitted. The user B also puts forward his own opinions and shares a web page link of "Opposite Sichuan Restaurant (104, Garden Community, No. 22 Kunming Road)" in the session window. The user C transmits a picture of roast duck and points out that "there is a new roast duck restaurant 900 meters away from the company. Friends said it tastes good." The user D transmits a message "Any restaurant suits me fine. How about playing billiards after dinner?".

After each member of the group posts suggestions for Friday dinner, the user A may select some messages in the group session window. These selected messages are used as group session messages that need to be parsed subsequently. To easily distinguish these selected messages from other messages, the group session messages on which the user performs a message selection operation herein are referred to as to-be-parsed group session messages.

Figure 4:
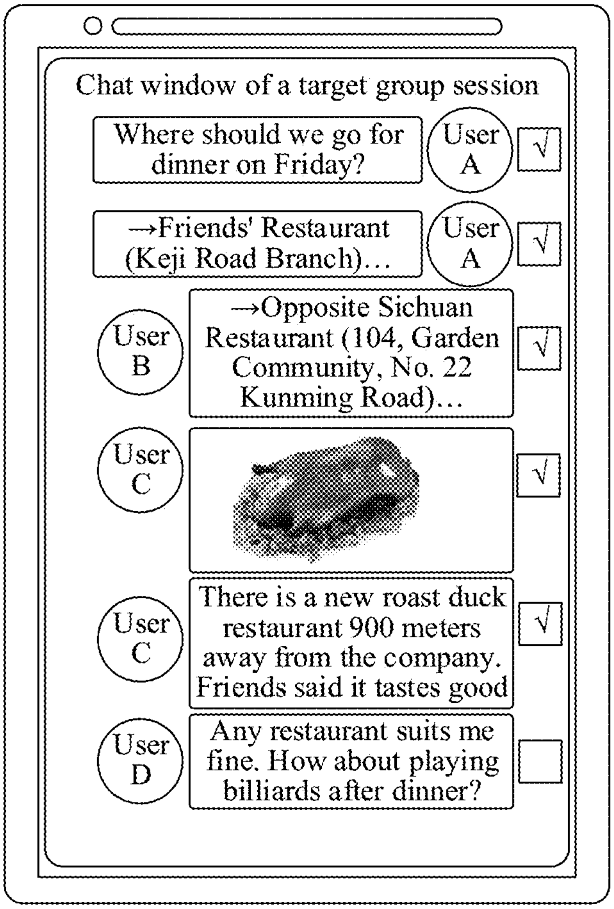
FIG. 4 is a schematic diagram of selecting some messages in a target group session window according to some embodiments.

In some embodiments, the user A may perform the message selection operation in the target group session window through multiple-selection. In some embodiments, once the user triggers a message multi-selection function in the application program of the software, the message selection operation may be performed on the group session messages in the window. FIG. 4 is a schematic diagram of selecting some messages in a target group session window. Combining FIG. 3 and FIG. 4, it is easy to find that for the user, it is very intuitive to see which session messages are selected and which session messages are not selected in the target group session window. That is, in the target group session window, the selected and unselected messages are in different states. Taking FIG. 4 as an example, a selected logo (with a check mark in a rectangular box) is displayed on a side of the selected message, and an unselected logo is displayed on a side of the unselected message. In some embodiments, the selected and unselected messages may be displayed in another manner For example, a background color of the selected messages is a first color, and a background color of the unselected messages is a second color; In some embodiments, a bubble border of the selected messages is a first-type border, and a bubble border of the unselected messages is a second-type border. Since the user performs the message selection operation on the messages in the target group session window, the terminal device corresponding to the user may determine the to-be-parsed group session messages in response to the message selection operation performed on the target group session window. Taking FIG. 4 as an example, these selected messages are used as to-be-parsed group session messages.

For messages that have been selected by the user (the creator of the group voting), the terminal device may obtain these messages for subsequent parsing.

Operation 2004. Generate a voting option based on the group session message, and post a group voting including the voting option through the document editing tool.

In some embodiments, operation 2004 may include: obtaining a plurality of pieces of option information by parsing the group session message; generating the voting option by separately displaying the plurality of pieces of option information on each option position in the voting editing page; and posting the group voting including the voting option in response to a trigger operation on a posting control in the voting editing page.

In some embodiments, the group session messages are often a rich text, including a text, a picture, a video, a web page link, and other forms. These different forms of messages may be selected by the user and used as to-be-parsed group session messages. In some embodiments, the to-be-parsed group session messages include messages in at least two forms of a text, a picture, a video, or a web page link. Taking the picture, the video, and the web page link as examples, in the previous technology, the creator usually completes additional manual operations and understanding to obtain and refine semantics and create a voting option. As long as the to-be-parsed group session messages are determined, once the parsing is triggered, the automatic parsing of the messages may be completed without relying on manpower, and intelligent filling of relevant positions in the voting editing page may be realized to generate the voting option.

In some embodiments, a path and a control used for triggering the parsing of the group session messages may be preset. Once the user performs a trigger operation on such a control under the corresponding path, it indicates that the user intends to parse the to-be-parsed group session messages that are determined above. The terminal device may fill option information obtained by parsing into the voting editing page in response to the trigger operation of parsing the to-be-parsed group session messages.

Figure 5A:
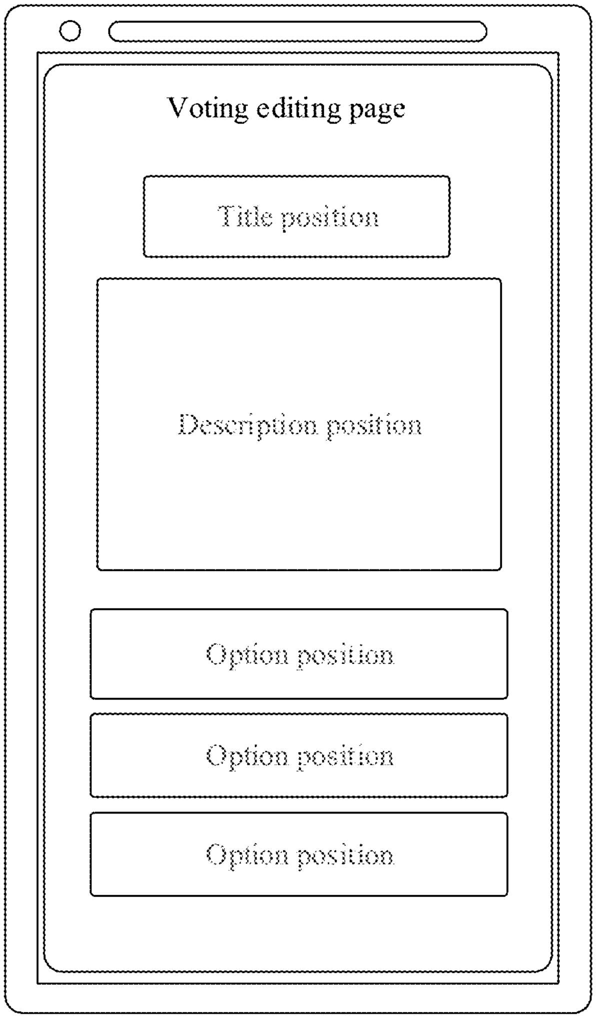
FIG. 5A is a schematic diagram in which an option position in a voting editing page is blank according to some embodiments.
Figure 5B:
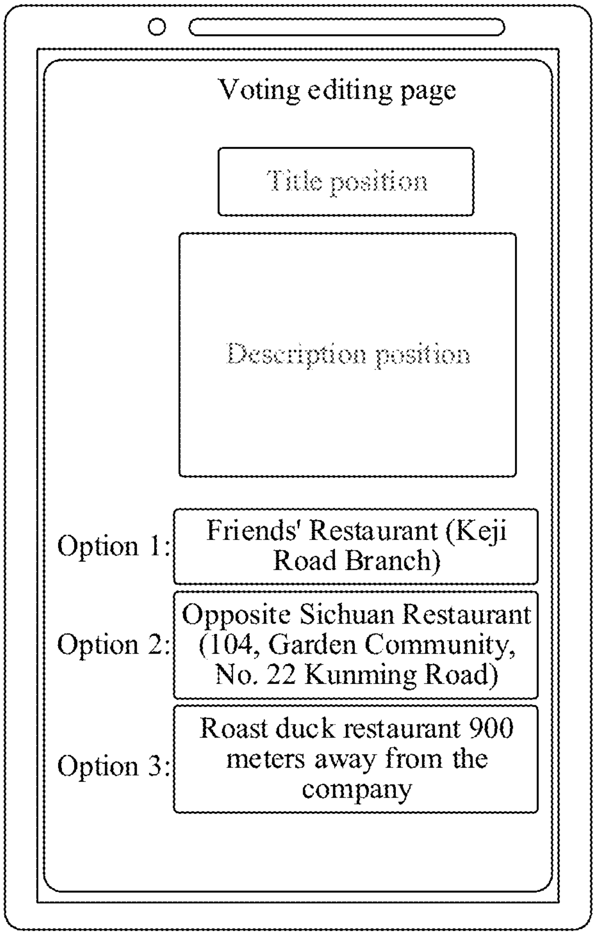
FIG. 5B is a schematic diagram in which a voting option is generated after information is filled in an option position in a voting editing page according to some embodiments.

In some embodiments, the voting editing page includes a voting parameter setting item, such as a voting option, a voting deadline, a voting description, a voting title, and the like. Before the voting option is generated, the option position is empty. Similarly, before the voting description is generated, the voting description position is empty. Before the voting title is generated, the title position is empty. A plurality of option positions are displayed, and each option position corresponds to a voting option separately. By filling the option information into the option position, a plurality of voting options are generated. FIG. 5A is a schematic diagram in which an option position in a voting editing page is blank. FIG. 5B is a schematic diagram in which a voting option is generated after information is filled in an option position in a voting editing page.

The option information includes information used for generating the voting options obtained by parsing the to-be-parsed group session messages. The form and the type of the information used for generating the voting options obtained by parsing are not limited herein, for example, may include a text and a picture. In addition, in a real-time application, the to-be-parsed group session messages may further be parsed to obtain position information about the voting options. The position information is also used as auxiliary information to generate the voting options. Through the position information, group members may more clearly and intuitively understand a geographical position of a place corresponding to the voting option. In this way, a voting result that is more in line with the intentions and requirements of the group members is obtained.

For example, if the group session message is a discussion about a restaurant, the information used for generating the voting options obtained by parsing may include: a restaurant name, a restaurant position, a restaurant flavor description, a restaurant main dish name and picture, and the like. In addition, the option information may further include an identifier of a sender of the to-be-parsed group session message in the target group session window. For example, the user B shares a web page link of "Opposite Sichuan Restaurant (104, Garden Community, No. 22 Kunming Road)" in the session window, and the word "User B" is also marked next to the generated voting option "Opposite Sichuan Restaurant". In this way, other users may very intuitively see which group member proposed this voting option when voting. For example, the user B is known to have a good taste in choosing restaurants and is not prone to "missteps". Therefore, the "User B" logo displayed in the voting option may help everyone choose restaurants that are more likely to be satisfactory. In some embodiments, the voting options are not limited to restaurants, depending on the purpose of initiating a group voting. For example, the voting options may further be types of outdoor sports, positions of weekend outings, tastes of drinks, and the like.

When the voting parameter setting item in the voting editing page is filled in, the creator may trigger to post the group voting. In some embodiments, the posting the group voting in response to a trigger operation on a posting control in the voting editing page includes:

generating, in response to the trigger operation on the posting control, an open path of the group voting through the document editing tool; and posting, in response to a trigger operation for sharing the open path, the group voting by sharing the open path. The open path is in one of the following forms: an identifier, a link, a hyperlink, or a storage address of the voting editing page. In some embodiments, the identifier may be in the form of a QR code, a barcode, or the like, for a voting collaborator to trigger. When the open path is generated and shared with the collaborator, the collaborator may trigger and vote.

The method for posting a group voting provided in the embodiments can automatically parse the group session messages to generate the voting option, and can replace a process of manually sorting messages and summarizing people's intentions, realizing automatic filling in of the option, and avoiding complex and cumbersome operations such as editing the voting option, thereby improving the efficiency of posting the group voting. In addition, the document editing tool provides a trigger mechanism for the voting entrance, making voting very convenient to initiate and easy to implement, and providing a better user experience.

As mentioned above in operation 2004, the group voting is posted. In some embodiments, the open path of the group voting may be shared to the target group session. In some embodiments, these options, descriptions, and titles of the group voting may further be used for individuals in another scenario and environment to make a voting decision. Therefore, the open path may further be shared to a custom path outside the target group session. In some embodiments, the creator may customize and configure a to-be-shared path before the open path is generated. If the target group session is a group session in an instant messaging application, the custom path may include one of the following: a group sessions other than the target group session in the instant messaging application, another social application, a network platform, or an address book of a terminal device. That is to say, in some embodiments, it is not limited to sharing the open path to the target group session. The foregoing group voting posted in the target group session may further be shared to other group sessions in the application or an address book of other social applications, network platforms, or terminal devices. Multiple applications and diversified applications of the voting parameter setting items in the group voting is realized, so that the scope of use of these setting items is expanded. Certainly, the custom path may be set according to actual requirements without violating laws and regulations.

The document editing tool may be an editing tool with a collaborative function. Therefore, the group voting posted by the creator may further be used for other collaborative viewing documents for editing operations, subject to authorization. In some embodiments, other users who trigger the open path may see the displayed voting posting page, which also includes some or all of the voting parameter setting items in the voting editing page before the group voting is posted, including at least the voting options that have been filled in. The method provided in some embodiments may further include:

in a case that it is identified that a user who triggers the open path is an authorized collaborative editing user, displaying a voting posting page of the group voting after the open path is triggered; and updating the voting posting page in response to an editing operation on the voting option by the collaborative editing user in the voting posting page.

For example, if a collaborator discovers a typo in a voting option, and if the collaborator is a user who has been authorized by the creator to collaborate on editing, an editing function is triggered on the voting posting page to perform an editing operation and correct the typo. Certainly, editing content is not limited to the voting options, and may further involve editing other voting parameter setting items.

In this way, in the function of the document editing tool of initiating and posting a group voting, a collaborative operation characteristic is fully utilized to improve the accuracy of the voting parameter setting items in the group voting, thereby improving the accuracy and effectiveness of the group voting.

Figure 5C:
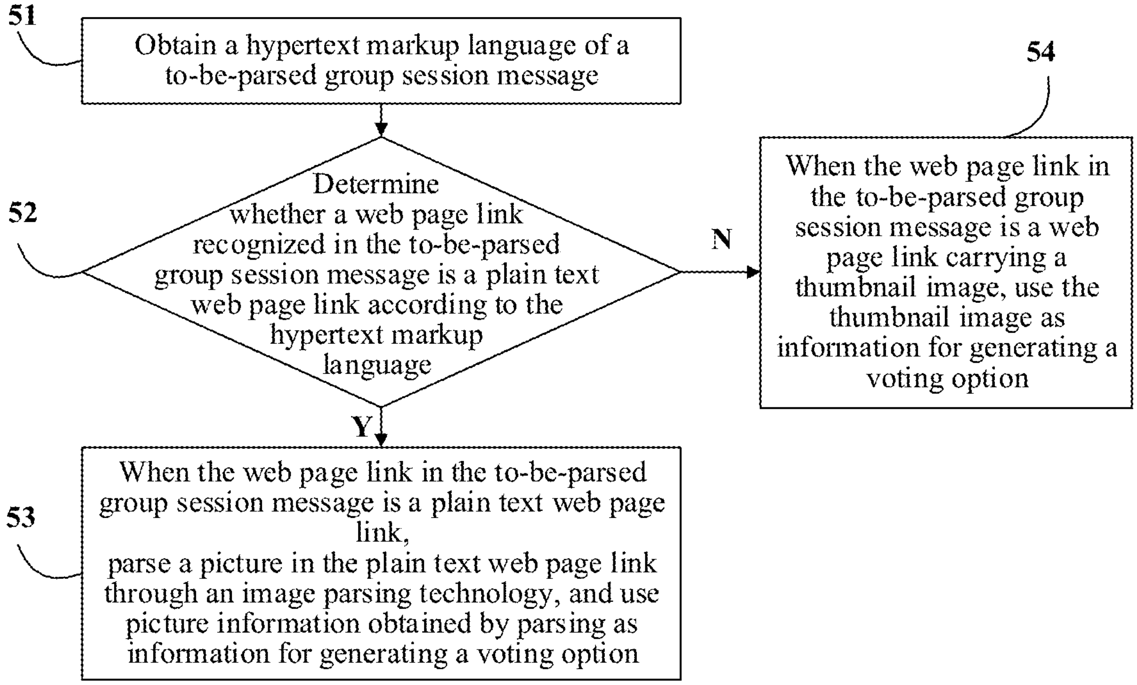
FIG. 5C is a flowchart of parsing a group session message according to some embodiments.

In some embodiments, parsing the group session messages is a relatively important link. The web page link is also used as an example of a group session message below, and the implementation of a parsing process in the method for posting a group voting is introduced with reference to FIG. 5C. FIG. 5C is a flowchart of parsing a group session message according to some embodiments. As shown in FIG. 5C, after the to-be-parsed group session message is determined, parsing the group session message to obtain information used for generating the voting option includes the following operations:

Operation 51. Obtain a hypertext markup language of a group session message.

Operation 52. Determine whether a web page link recognized in the group session message is a plain text web page link according to the hypertext markup language. If so, perform operation 53; and if not, perform operation 54.

Operation 53. In a case that it is identified based on the hypertext markup language that a web page link in the group session message is the plain text web page link, parse a picture in a plain text web page link through an image parsing technology, and use picture information obtained by parsing as information for generating the voting option.

In this operation, the image parsing technology may be used to parse the image, which may be performed by a terminal device, or may be performed by a server. For example, a communication software client on the terminal device may request the server to parse a picture in the plain text web page link through the image parsing technology. After receiving the request, the server parses the picture in the web page link and feeds back picture information to the client. The client receives the picture information returned by the server, which may be used for generating the voting option in the voting editing page. The image parsing technology understands the semantics included in the image through image understanding, which can not only identify the semantics in the picture, but also assign a classification tag to the picture. Therefore, the picture information may include the picture, and may further include semantic information, a classification tag, and the like. The picture in the picture information may be an original picture after the web page link is opened, or may be a screenshot obtained by intercepting the original picture.

Operation 54. In a case that it is identified based on the hypertext markup language that the web page link in the group session message is a web page link carrying a thumbnail image, use the thumbnail image as the information for generating the voting option.

Since the thumbnail image is generally a picture that is representative of the content within the web page link, the thumbnail image may be used directly when the voting option is generated.

In some embodiments, a web page link is used as an exemplary to-be-parsed group session message to introduce the parsing process, and the parsing measures taken for the differences in content types included therein are introduced. In some embodiments, the parsed content is not limited to a web page link, and may further include a text, a picture, a video, and the like. The accuracy of content parsing depends on the maturity of the image parsing technology. In some embodiments, the communication software may complete the image parsing operation by developing a set of image recognition services.

To make the option information more accurate, and thus the generated voting option more accurate, some embodiments provide a technical solution oriented to a web page developer and in which the web page developer and a communication software developer cooperate with each other. This technical solution is applied in a scenario in which the web page link is shared to a group session window. The web page link in the to-be-parsed group session message is a web page link shared to the target group session window by invoking a sharing function. The web page link is configured as that in a case that a web page is opened, a global variable of the web page is injected into a software development tool packet. The software development tool packet is used for being invoked when the web page is initialized to provide information corresponding to the web page for generating the voting option. Since the software development tool packet is injected into the global variable of the web page, when the web page needs to be opened, initializing the web page requires invoking the software development tool packet. The method for posting a group voting provided in some embodiments invokes the software development tool packet to receive the information corresponding to the web page for generating the voting option. In some embodiments, the software development tool packet provides an interface for the web page developer to fill in the information for generating the voting option. If the web page developer intends to enable the content of the web page to be shared to generate the voting option for people to vote, that is, it only needs to provide the information corresponding to the web page for generating the voting option through the software development tool packet. The web page developer may be a staff member of a merchant or an Internet operator. There are no limitations on an identity of the web page developer herein.

For example, the information provided by the web page developer may include: title information and an introduction picture of the web page. For the same web page link, the web page title and the introduction picture corresponding to the web page are filled in the same option position on the voting editing page to generate the voting option. For example, for the web page link shared by the user B, the web page title and the introduction picture corresponding to the web page are used for generating a voting option B; and for the web page link shared by the user C, the web page title and the introduction picture corresponding to the web page are used for generating a voting option C.

Since the web page developer passes in the foregoing information for generating the voting option, after the group voting is initiated, the voting editing page is displayed. The voting editing page on the terminal device may obtain the previously passed information through the software development tool packet, and then generate the voting option and display the web page title and the introduction picture. Since the information is passed in by the web page developer in advance, it is more accurate than the information obtained through parsing and recognition, which makes the generated voting option more accurate. In some embodiments, the information passed in by the web page developer and the parsed information obtained by the terminal device may complement each other and jointly create the voting option. For example, refer to the information passed in by the web page developer to create and generate the voting option; or the information obtained by parsing is used as a supplement to the information passed in by the web page developer, and then the voting option is created and generated. Compared with a voting option in a plain text, a voting option with an introduction picture is more intuitive and easy to understand, and can help the collaborator vote quickly.

In the solution introduced above, a solution is proposed for the web page developer to pass in the information through the software development tool packet to generate the voting option. In some embodiments, a meta tag (meta tag) corresponding to the web page link in the to-be-parsed group session message may be configured to: state that the web page link is allowed to be parsed after the web page link is shared. In this way, after the web page link is shared to the target group session window through the sharing function, due to the declaration of the meta tag configuration, the terminal device may parse or request the server to parse the content in the web page link, thereby obtaining the information used for generate the voting option.

In addition to the voting option, other information may be included on the voting editing page, such as a voting description and a voting title. The voting description and the voting title may be manually edited by the creator, or similar to the voting option, the voting description and the voting title may be generated after parsing the to-be-parsed group session message and filled in intelligently. In some embodiments, before the posting the group voting through the document editing tool, the method for posting a group voting provided in some embodiments may further include:

obtaining at least one of description information and title information by parsing the to-be-parsed group session message;

in a case that a description option is obtained, generating a voting description by displaying the description information at a voting description position of the voting editing page; and in a case that a title option is obtained, generating a voting title by displaying the title information at a title position of the voting editing page.

By parsing the description information and the title information and filling them in the voting editing page, the entire process of posting a group voting can be easier and simpler, and the manual editing work of the creator is greatly reduced, which reduces the editing burden of the creator and reduces tedious operations.

The implementation of the group voting solution and the posting of the group voting in some embodiments rely on the analysis and the parsing of data. In particular, the foregoing analysis and parsing are based on an environment in which the group voting occurs, that is, the target group session window. A series of group session messages that are selected and parsed are the basis for posting the group voting. However, the user applies the technology to post the group voting on the premise that the user already knows the usage scenarios and usage methods of the group session message. When various embodiments are applied to specific products or technologies, permission or consent of the user is required, and the collection, use and processing of relevant data need to comply with the relevant laws, regulations and standards of relevant countries and regions.

For example, after the user performs a trigger operation on the voting module or the user performs a trigger operation on a control for adding an option in the target group session window, a prompt window pops up first. The usage methods and usage scenarios of the selected session messages are stated in the window, and the session messages and the parsed information used for generating the voting option are not used for other scenarios, or used by a third party without the user's consent. Only when the user clicks the confirmation or an authorization control in the prompt window can the session messages be parsed.

Figure 5D:
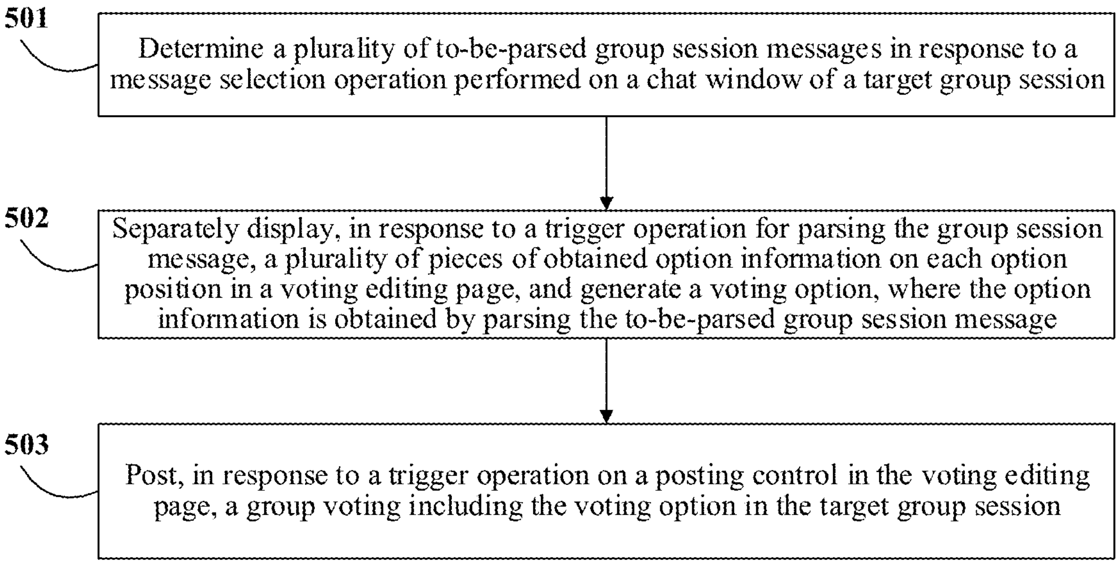
FIG. 5D is a flowchart of a method for posting a group voting according to some embodiments.

Other method embodiments for posting a group voting are introduced below. FIG. 5D is a flowchart of a method for posting a group voting according to some embodiments. Referring to FIG. 5D, the method for posting a group voting includes the following operations:

Operation 501. Determine a plurality of to-be-parsed group session messages in response to a message selection operation performed on a chat window of a target group session.

By virtue of the target group chat session window and not relying on the document editing tool, some embodiments can also implement the initiating and posting of the group voting. In a specific implementation, a voting module may be set in the instant messaging software for the user to use. Under this mechanism, a plurality of to-be-parsed group session messages may be determined in response to a message selection operation.

Since the selection of messages is vividly described in the foregoing embodiments, with reference to FIG. 3 and FIG. 4, details are not described herein again.

Operation 502. Separately display, in response to a trigger operation for parsing the group session message, a plurality of pieces of obtained option information on each option position in a voting editing page, and generate a voting option, where the option information is obtained by parsing the group session message.

For different paths, the trigger operation of parsing the to-be-parsed group session message may be different. This trigger operation is described below by combining two paths. The display of the option information at the option position is essentially an intelligent filling of a result of parsing the group session message.

Operation 503. Post, in response to a trigger operation on a posting control in the voting editing page, a group voting including the voting option in the target group session.

In the foregoing embodiment, the group session messages can be automatically parsed to generate the voting option, and a process of manually sorting messages and summarizing people's intentions can be replaced, realizing automatic filling in of the option, and avoiding complex and cumbersome operations such as editing the voting option, thereby improving the efficiency of posting the group voting.

Figure 6A:
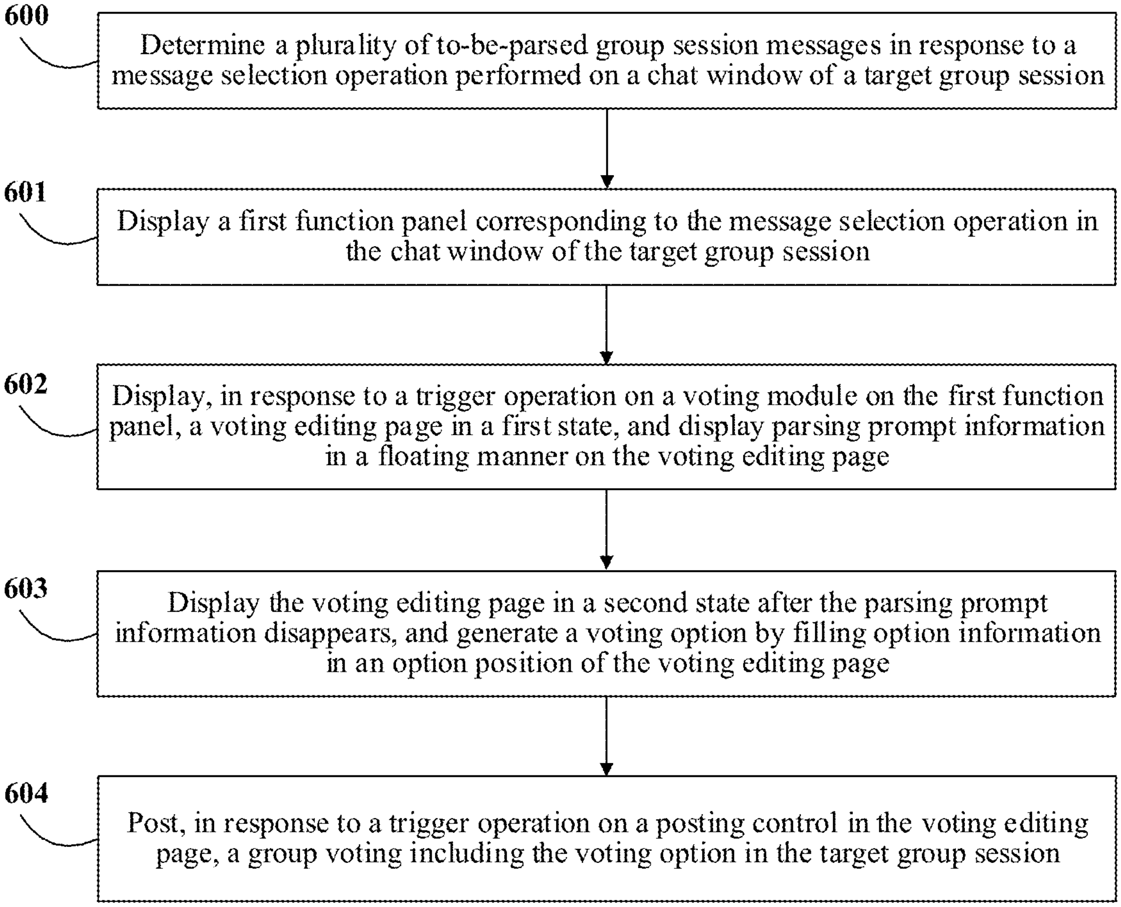
FIG. 6A is a flowchart of posting a group voting according to some embodiments.
Figure 6B:
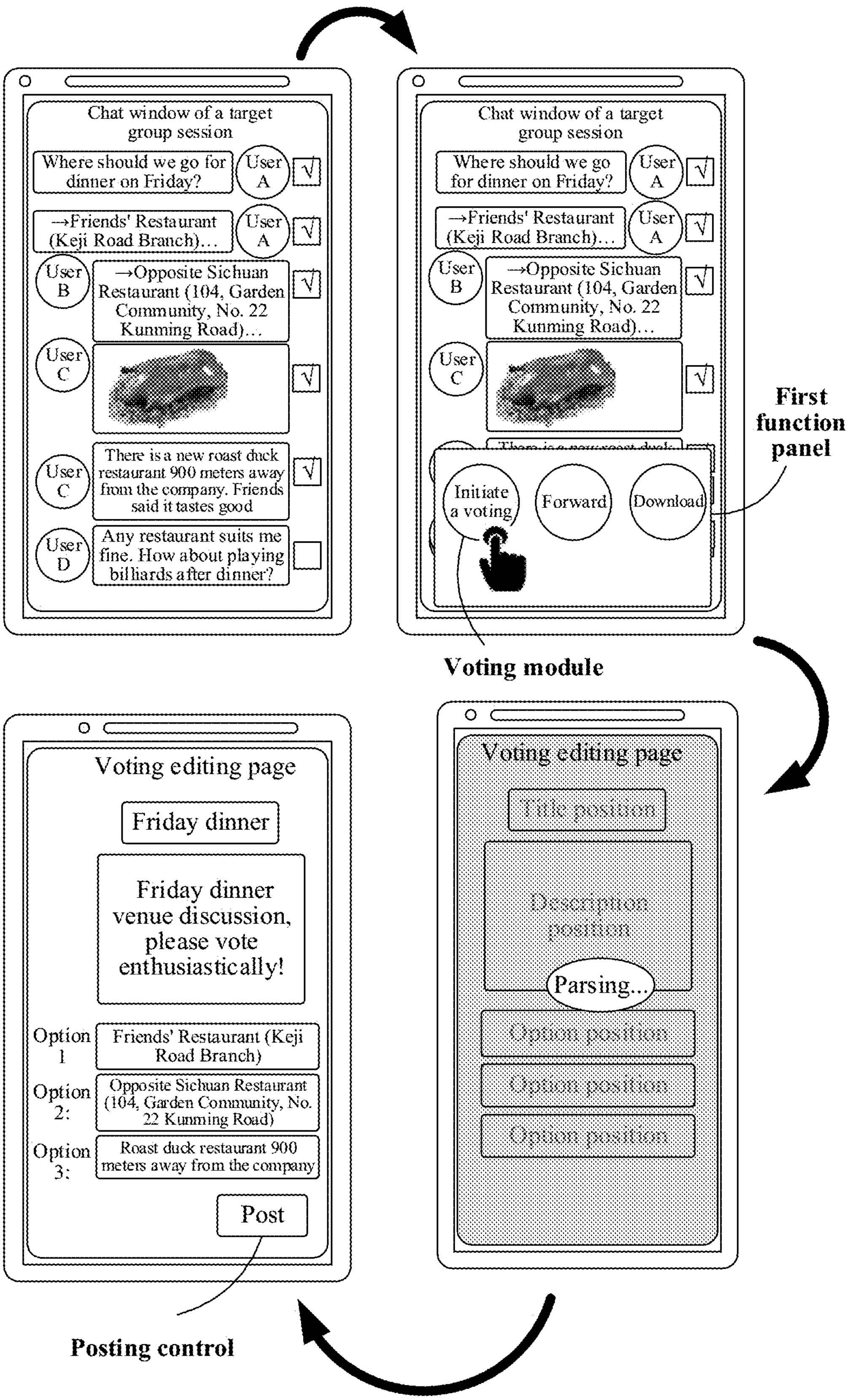
FIG. 6B is an interface view of posting a group voting on a terminal device corresponding to FIG. 6A.
Figure 7A:
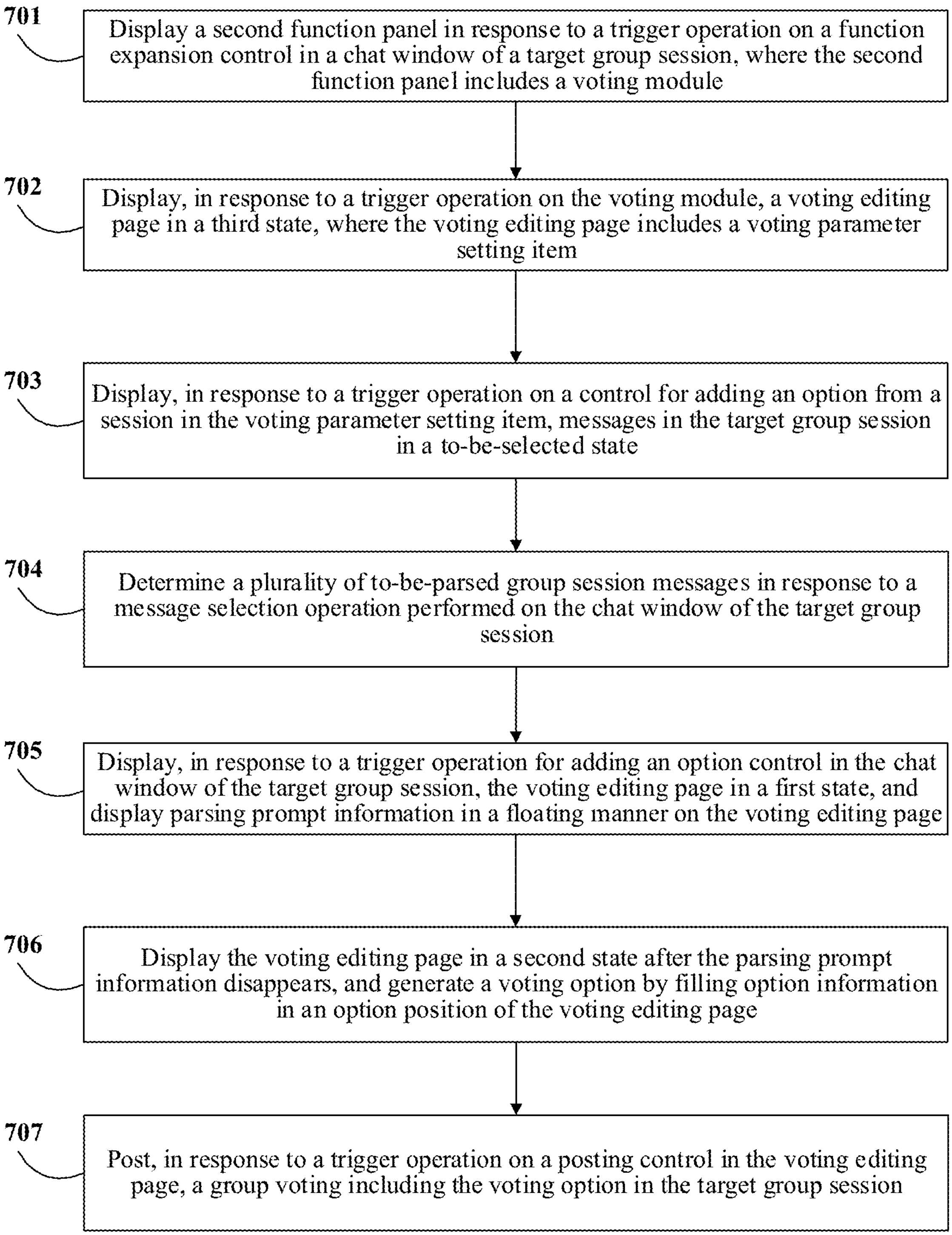
FIG. 7A is a flowchart of a method for posting a group voting according to some embodiments.
Figure 7B:
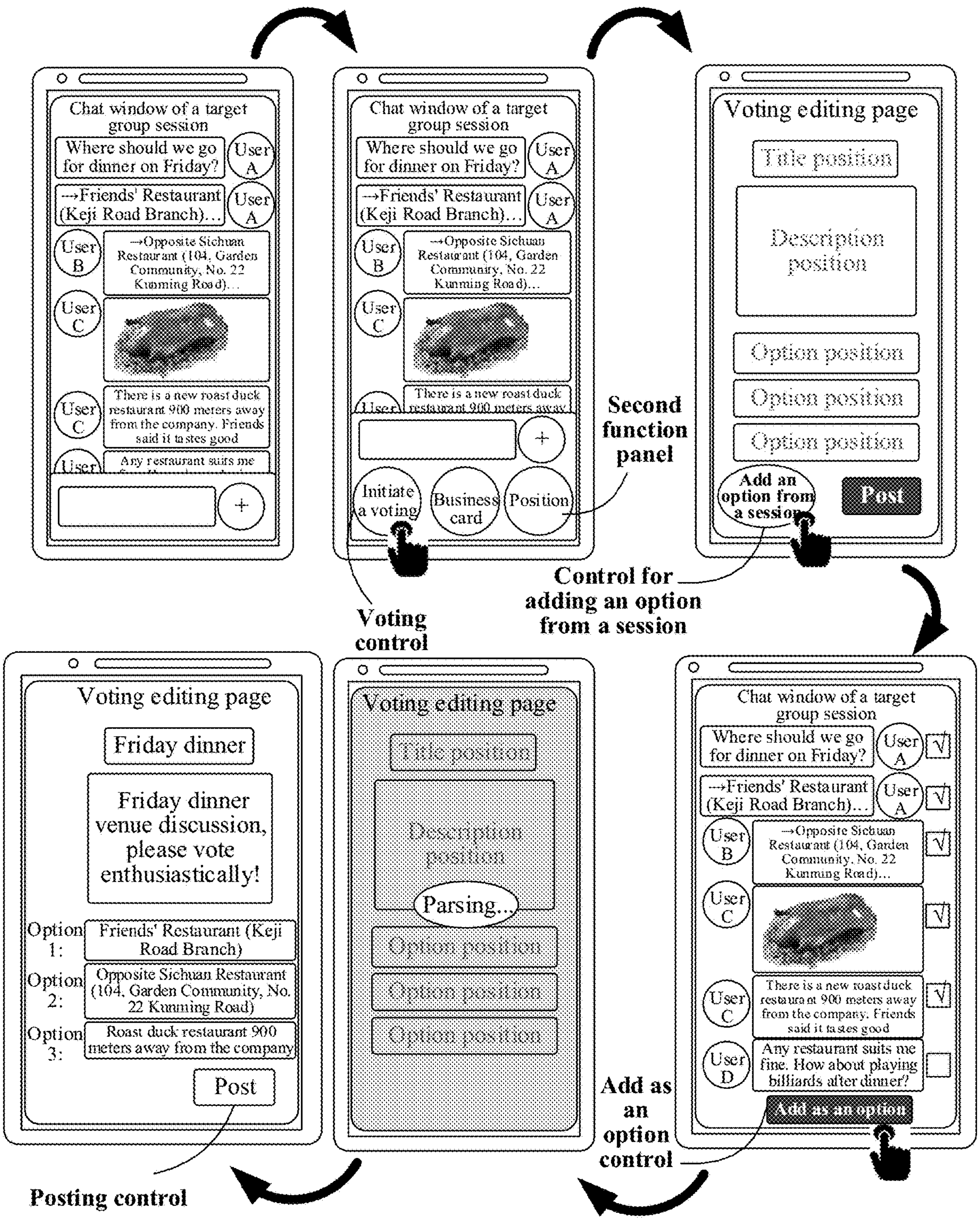
FIG. 7B is an interface view of posting a group voting on a terminal device corresponding to FIG. 7A.

Based on the method process related to FIG. 5D above, two different posting paths are introduced. Refer to FIG. 6A and FIG. 7A respectively. FIG. 6B is an interface view of posting a group voting on a terminal device corresponding to FIG. 6A. FIG. 7B is an interface view of posting a group voting on a terminal device corresponding to FIG. 7A.

For a first path for posting a group voting, refer to FIG. 6A and FIG. 6B. FIG. 6A is a flowchart of posting a group voting according to some embodiments. FIG. 6B is an interface view of posting a group voting on a terminal device corresponding to FIG. 6A. In short, the first path for posting a group voting involves the following process: The creator performs multiple-selection on the messages in the session window. After the multiple-selection, the first function panel is displayed on the terminal device. The creator clicks the voting module in the first function panel to parse the to-be-parsed group session message and intelligently fill in the voting editing page to generate the voting option, and the creator posts the group voting.

In the examples of FIG. 6A and FIG. 6B, in response to the trigger operation of parsing the to-be-parsed group session message, filling the option information into the option position of the voting editing page and generating voting options may include the following operations 600 to 603.

Operation 600. Determine a plurality of to-be-parsed group session messages in response to a message selection operation performed on a chat window of a target group session.

The target group session is a group session in an instant messaging application; and the separately displaying, in response to a trigger operation for parsing the group session message, a plurality of pieces of obtained option information on each option position in a voting editing page, and generating a voting option includes: separately displaying, in response to a trigger operation on a voting module provided by the instant messaging application, the plurality of pieces of obtained option information on each option position in the voting editing page, and generating the voting option. In some embodiments, refer to operations 601 to 603 below.

Operation 601. Display a first function panel corresponding to the message selection operation in the chat window of the target group session.

Operation 602. Display, in response to a trigger operation on a voting module on the first function panel, a voting editing page in a first state, and display parsing prompt information in a floating manner on the voting editing page.

Operation 603. Display the voting editing page in a second state after the parsing prompt information disappears, and generate a voting option by filling option information in an option position of the voting editing page.

When the creator performs a message selection operation on the messages in the target group session window, a screen of the terminal device displays the first function panel in the target group session window. That is, the first function panel may be a panel automatically displayed in response to the message selection operation. A variety of controls may be displayed in the first function panel, and different controls may complete different functions separately after being triggered. For example, the first function panel includes a voting module. Since the group session messages are selected previously, when the creator triggers the voting module, it means that the creator intends to parse these selected to-be-parsed group session messages. The trigger operation on the voting module is used as the trigger operation of parsing the to-be-parsed group session messages.

The voting module for the first function panel is triggered, and the voting editing page may be displayed in the first state first. In some embodiments that the voting editing page is displayed in response to the trigger operation on the voting module. The first state refers to a state in which the voting editing page cannot be edited while the to-be-parsed group session messages are being parsed. In some embodiments, the voting editing page in the first state is displayed in a first background color, and other states are displayed in other background colors. To facilitate the creator to know the state of the voting editing page and the parsing process of the messages, in some embodiments, the parsing prompt information may be displayed in a floating manner on the voting editing page. For example, the word "Parsing" may be displayed in the floating manner on the voting page. In some embodiments, the parsing progress may further be displayed, such as a progress bar, an hourglass, and the like to display the parsing progress.

The parsing prompt information disappears after the to-be-parsed group session messages are parsed. The second state of the voting editing page means that the voting editing page is in an editable state. On the voting editing page in the second state, the option position on the voting editing page can be automatically filled in according to the option information obtained by parsing. Therefore, comparing the voting editing page in the first state and the voting editing page in the second state, the creator can intuitively see that the voting option is created from scratch. Different from the voting editing page in the first state mentioned above, in an example, the voting editing page in the second state is displayed in a second background color. In the second state, the posting control is in a lighting state, and the lighting state indicates that the posting control is in a triggerable state. Furthermore, perform operation 604.

Operation 604. Post, in response to a trigger operation on a posting control in the voting editing page, a group voting including the voting option in the target group session.

For the second path for posting a group voting, refer to FIG. 7A and FIG. 7B. FIG. 7A is a flowchart of a method for posting a group voting according to some embodiments. FIG. 7B is an interface view of posting a group voting on a terminal device corresponding to FIG. 7A. In short, the second path for posting a group voting involves the following process: The creator triggers a function expansion control in the session window, and then expands the second function panel; the second function panel includes a triggerable voting module; and after triggering the voting module, the creator may select some group session messages to parse out the option information, then fill in the voting option and initiate the group voting. Different from the first path for posting a group voting, in the second path for posting a group voting, voting is initiated first and then the group session messages are selected. In the first path for posting a group voting, the group session messages are selected first and then the voting is initiated.

Before the determining a plurality of to-be-parsed group session messages in response to a message selection operation performed on a chat window of a target group session, the method further includes: displaying, in response to a trigger operation on a voting editing path provided in the chat window of the target group session, the messages in the target group session in a to-be-selected state. This operation may include the following operations:

Operation 701. Display a second function panel in response to a trigger operation on a function expansion control in a chat window of a target group session, where the second function panel includes a voting module.

The target group session window includes a function expansion control. Due to the limited scope of the interface, if all function controls are displayed in the target group session window, a visual effect is complicated and not succinct. Therefore, the function controls with high usage are generally displayed in the session window, and the function controls with low usage or the function controls that occupy a large area are hidden. The function expansion control is configured to expand and present the foregoing hidden function controls. In some embodiments, when the function expansion control is triggered, the second function panel is displayed. One or more hidden function controls are presented on the second function panel. For example, the second function panel includes a voting module. By triggering the voting module, the creator may initiate a voting.

Operation 702. Display, in response to a trigger operation on the voting module, a voting editing page in a third state, where the voting editing page includes a voting parameter setting item.

Once the voting module is triggered, the terminal device displays the voting editing page in a third state. The voting editing page in the third state is in an editable state and has a function of parsing the group session messages and adding them as voting options. In the third state, the posting control displayed on the voting editing page is in an unlighting state. In some embodiments, a control called "Add Option from Session" is included in the voting editing page in the third state.

Operation 703. Display, in response to a trigger operation on a control for adding an option from a session in the voting parameter setting item, messages in the target group session in a to-be-selected state.

Once the control for adding as an option from the session is triggered, the terminal device displays the group session messages of the target group session window in a to-be-selected state, so that the creator may select some of the group session messages as to-be-parsed group session messages.

Operation 704. Determine a plurality of to-be-parsed group session messages in response to a message selection operation performed on the chat window of the target group session.

In response to a trigger operation of parsing the to-be-parsed group session messages, filling the option information into the option position in a voting editing page, and generating a voting option may include the following operation 705 and operation 706.

Operation 705. Display, in response to a trigger operation for adding an option control in the chat window of the target group session, the voting editing page in a first state, and display parsing prompt information in a floating manner on the voting editing page.

In the target group session window, the group session messages are displayed in the to-be-selected state for the creator to select the messages. In addition, a control called "Add as Option" is displayed. The control for adding as an option is in the lighting state and supports being triggered. In this implementation, the trigger operation on the control for adding as an option in the target group session window is used as the trigger operation of parsing the to-be-parsed group session messages. Once the creator selects some group session messages and triggers the control for adding as an option, it means that these selected messages (that is, the to-be-parsed group session messages) need to be parsed through the method of this embodiment to fill in the option position and generate the voting option. In this case, the voting editing page is displayed in the first state and the parsing prompt information is displayed in a floating manner.

Operation 706. Display the voting editing page in a second state after the parsing prompt information disappears, and generate a voting option by filling option information in an option position of the voting editing page.

Operation 707. Post, in response to a trigger operation on a posting control in the voting editing page, a group voting including the voting option in the target group session.

Figure 8A:
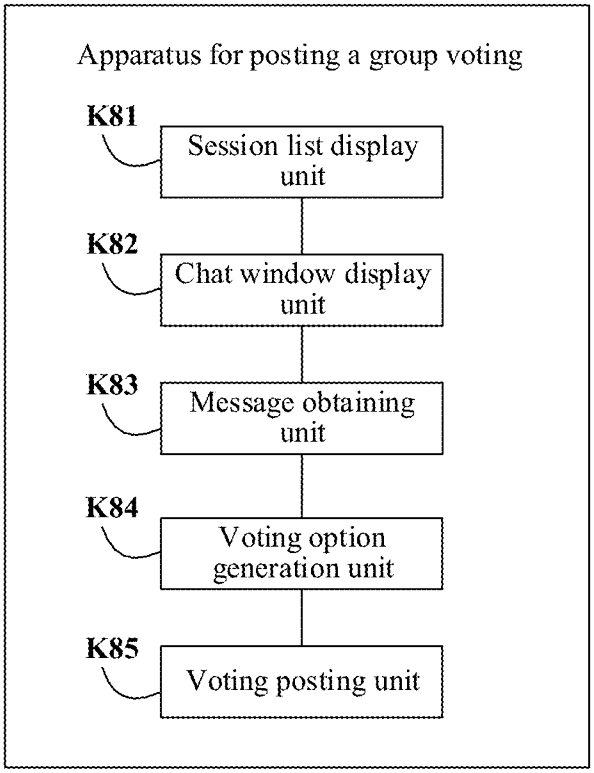
FIG. 8A is a schematic diagram of a structure of an apparatus for posting a group voting according to some embodiments.

Based on the method for posting a group voting provided in the foregoing embodiments, correspondingly, some embodiments provide an apparatus for posting a group voting. The following provides descriptions with reference to FIG. 8A and FIG. 8B. FIG. 8A is a schematic diagram of a structure of an apparatus for posting a group voting according to some embodiments. The apparatus for posting a group voting shown in FIG. 8A includes:

- a session list display unit K81, configured to display a session list in response to a trigger operation on a voting entrance in a document editing tool;
- a chat window display unit K82, configured to display a chat window of a target group session in response to the determined target group session in the session list;
- a message obtaining unit K83, configured to obtain a plurality of to-be-parsed group session messages in the chat window;
- a voting option generation unit K84, configured to generate a voting option based on the group session message; and
- a voting posting unit K85, configured to post a group voting including the voting option through the document editing tool.

In some embodiments, the session list display unit K81 includes:

- a page display sub-unit, configured to create and display a voting editing page in response to the trigger operation on the voting entrance, where the voting editing page includes a voting parameter setting item; and
- a list display sub-unit, configured to display the session list in response to a trigger operation on a control for adding an option from a session in the voting parameter setting item.

In some embodiments, the voting option generation unit K84 is configured to:

- obtain a plurality of pieces of option information obtained by parsing the group session message; and
- generate the voting option by separately displaying the plurality of pieces of option information on each option position in the voting editing page; and
- the voting posting unit K85 is further configured to: post the group voting including the voting option in response to a trigger operation on a posting control in the voting editing page.

In some embodiments, the voting posting unit K85 is further configured to:

- generate, in response to the trigger operation on the posting control, an open path of the group voting through the document editing tool; and
- post, in response to a trigger operation for sharing the open path, the group voting by sharing the open path.

In some embodiments, the voting posting unit K85 is configured to:

- share the open path to the target group session; or
- share the open path to a custom path outside the target group session.

In some embodiments, the target group session is a group session in an instant messaging application; and the custom path includes one of the following:

- a group sessions other than the target group session in the instant messaging application, another social application, a network platform, or an address book of a terminal device.

In some embodiments, the apparatus for posting a group voting further includes:

- a permission identification unit, configured to in a case that it is identified that a user who triggers the open path is an authorized collaborative editing user, display a voting posting page of the group voting after the open path is triggered, where the voting posting page includes the voting option; and
- a voting posting page updating unit, configured to update the voting posting page in response to an editing operation on the voting option by the collaborative editing user in the voting posting page.

In some embodiments, the open path is in one of the following forms:

- an identifier, a link, a hyperlink, or a storage address of the voting editing page.

In some embodiments, the apparatus for posting a group voting further includes: a parsing unit, configured to parse the to-be-parsed group session message. The parsing unit may be configured to:

- obtain a hypertext markup language of the to-be-parsed group session message;
- in a case that it is identified based on the hypertext markup language that a web page link in the to-be-parsed group session message is the plain text web page link, parse a picture in a plain text web page link through an image parsing technology, and use picture information obtained by parsing as information for generating the voting option; and
- in a case that it is identified based on the hypertext markup language that the web page link in the to-be-parsed group session message is a web page link carrying the thumbnail image, use a thumbnail image as the information for generating the voting option.

In some embodiments, a web page link in the to-be-parsed group session message is a web page link in the target group session; the web page link is configured as that in a case that a web page is opened, a global variable of the web page is injected with a software development tool packet, where the software development tool packet is used for being invoked in a case that the web page is initialized to provide the voting parameter setting item corresponding to the web page; and

- the apparatus for posting a group voting may further include:

a tool package invoking unit, configured to invoke the software development tool packet to generate the voting parameter setting item corresponding to the web page.

In some embodiments, the voting option generation unit K84 is configured to:

generate a voting option by filling a web page title and an introduction picture corresponding to the web page into the voting editing page.

In some embodiments, a meta tag corresponding to a web page link in the group session message is configured to: state that the web page link is allowed to be parsed after the web page link is shared.

In some embodiments, the parsing unit is further configured to: obtain at least one of description information and title information by parsing the to-be-parsed group session message;

the apparatus further includes: a voting description generation unit and a voting title generation unit, where the voting description generation unit is configured to in a case that a description option is obtained, generate a voting description by displaying the description information at a voting description position of the voting editing page; and the voting title generation unit is configured to in a case that a title option is obtained, generate a voting title by displaying the title information at a title position of the voting editing page.

Figure 8B:
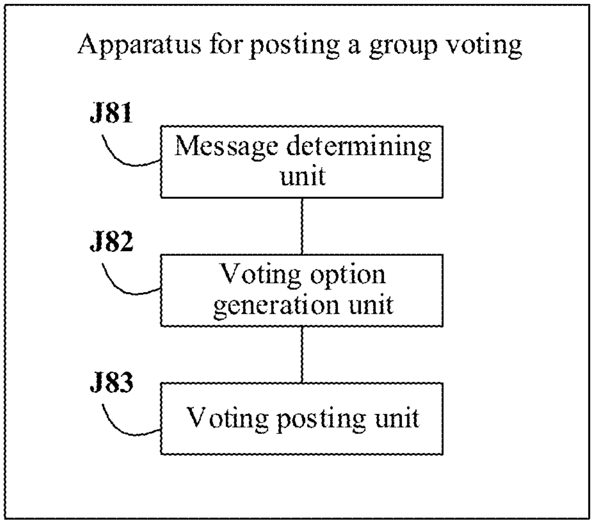
FIG. 8B is a schematic diagram of a structure of an apparatus for posting a group voting according to some embodiments.

In some embodiments, the to-be-parsed group session messages include messages in at least two forms of a text, a picture, a video, or a web page link FIG. 8B is a schematic diagram of a structure of an apparatus for posting a group voting according to some embodiments. The apparatus for posting a group voting shown in FIG. 8B includes:

a message determining unit J81, configured to determine a plurality of to-be-parsed group session messages in response to a message selection operation performed on a chat window of a target group session;

a voting option generation unit J82, configured to separately display, in response to a trigger operation for parsing the group session message, a plurality of pieces of obtained option information on each option position in a voting editing page, and generate a voting option, where the option information is obtained by parsing the group session message; and a voting posting unit J83, configured to post, in response to a trigger operation on a posting control in the voting editing page, a group voting including the voting option in the target group session.

In some embodiments, the target group session is a group session in an instant messaging application; and the voting option generation unit J82 is configured to:

separately display, in response to a trigger operation on a voting module provided by the instant messaging application, the plurality of pieces of obtained option information on each option position in the voting editing page, and generate the voting option.

In some embodiments, the voting option generation unit J82 is further configured to:

display a first function panel corresponding to the message selection operation in the chat window of the target group session;

display, in response to a trigger operation on the voting module on the first function panel, the voting editing page in a first state, and display parsing prompt information in a floating manner on the voting editing page; and display the voting editing page in a second state after the parsing prompt information disappears, and generate the voting option by filling the option information in the option position of the voting editing page.

In some embodiments, the apparatus for posting a group voting further includes:

a message display unit, configured to display, in response to a trigger operation on a voting editing path provided in the chat window of the target group session, the messages in the target group session in a to-be-selected state.

In some embodiments, the message display unit includes:

a panel display sub-unit, configured to display a second function panel in response to a trigger operation on a function expansion control in the chat window of the target group session, where the second function panel includes a voting module;

a page display sub-unit, configured to display, in response to a trigger operation on the voting module, the voting editing page in a third state, where the voting editing page includes a voting parameter setting item; and a message display sub-unit, configured to display, in response to a trigger operation on a control for adding an option from a session in the voting parameter setting item, the messages in the target group session in the to-be-selected state.

In some embodiments, the voting option generation unit J82 is configured to:

display, in response to a trigger operation for adding an option control in the chat window of the target group session, the voting editing page in a first state, and display parsing prompt information in a floating manner on the voting editing page; and display the voting editing page in a second state after the parsing prompt information disappears, and generate the voting option by filling the option information in the option position of the voting editing page.

The structure of a device for posting a group voting is introduced below in terms of a server form and a terminal device form separately.

Figure 9:
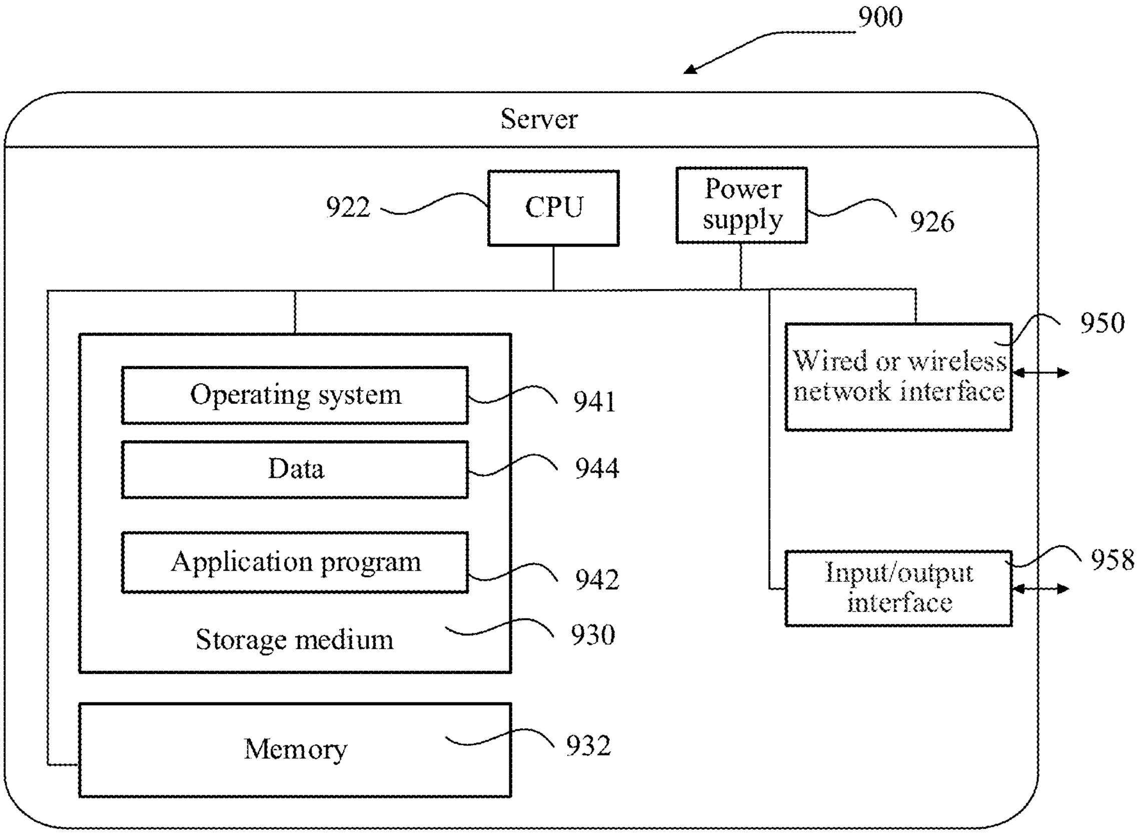
FIG. 9 is a schematic diagram of a structure of a server according to some embodiments.

FIG. 9 is a schematic structural diagram of a server according to some embodiments. The server 900 may vary greatly due to different configurations or performance, and may include one or more central processing units (CPU) 922 (for example, one or more processors) and a memory 932, and one or more storage medium 930 (for example, one or more mass storage devices) that store application programs 942 or data 944. The memory 932 and the storage medium 930 may be a transient memory or a persistent memory. A program stored in the storage medium 930 may include one or more modules (not shown in the figure), and each module may include a series of instruction operations for the server. Further, the CPU 922 may be configured to communicate with the storage medium 930 to execute a series of instruction operations in the storage medium 930 on the server 900.

The server 900 may also include one or more power supplies 926, one or more wired or wireless network interfaces 950, one or more input/output interfaces 958, and/or, one or more operating systems 941 such as Windows Server™, Mac OS X™, Unix™, Linux™, and FreeBSD™.

The CPU 922 is configured to perform the following operations:

displaying a session list in response to a trigger operation on a voting entrance in a document editing tool;

displaying a chat window of a target group session in response to the determined target group session in the session list;

obtaining a plurality of to-be-parsed group session messages in the chat window; and generating a voting option based on the group session message, and posting a group voting including the voting option through the document editing tool.

In some embodiments, the CPU 922 is configured to perform the following operations:

determining a plurality of to-be-parsed group session messages in response to a message selection operation performed on a chat window of a target group session;

separately displaying, in response to a trigger operation for parsing the group session message, a plurality of pieces of obtained option information on each option position in a voting editing page, and generating a voting option, where the option information is obtained by parsing the group session message; and posting, in response to a trigger operation on a posting control in the voting editing page, a group voting including the voting option in the target group session.

Figure 10:
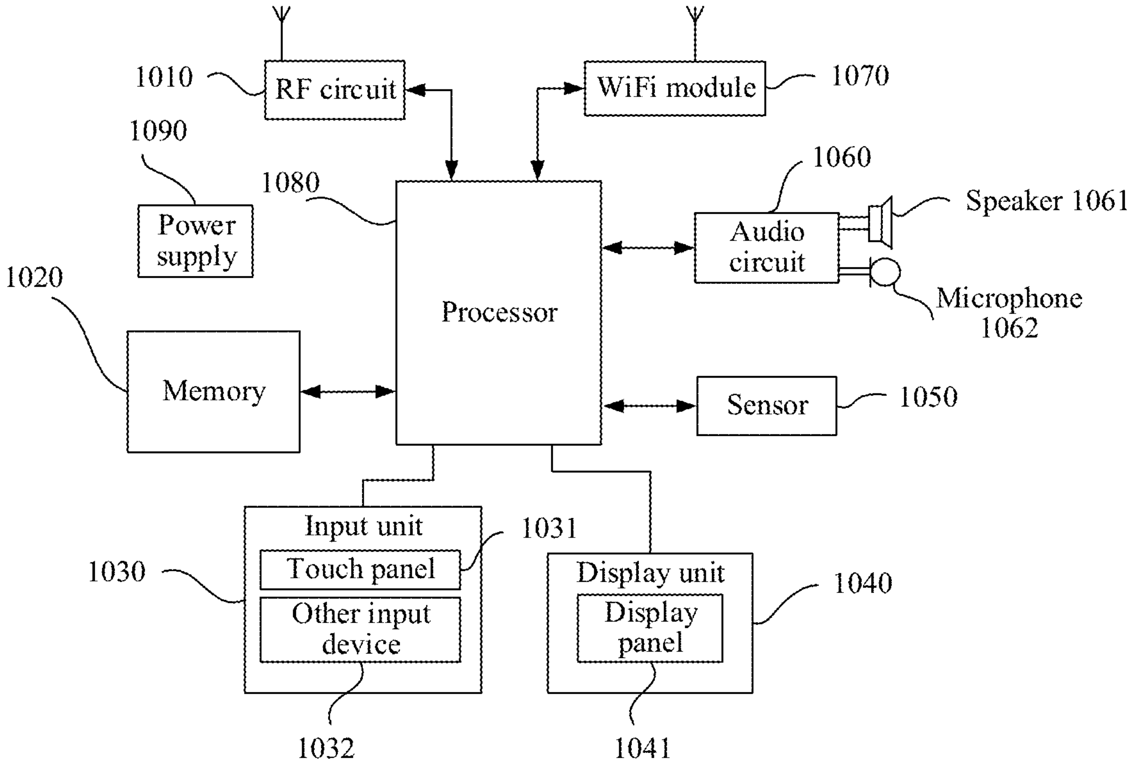
FIG. 10 is a schematic diagram of a structure of a terminal device according to some embodiments.

Some embodiments provide a device for posting a group voting, as shown in FIG. 10, and for ease of description, only parts related to some embodiments are shown. For specific technical details that are not disclosed, refer to the method part of some embodiments. The terminal may include any terminal device such as a mobile phone, a tablet computer, a personal digital assistant (PDA), a point of sales (POS), or an in-vehicle computer. An example in which the terminal is a mobile phone is used:

FIG. 10 is a block diagram of the structure of a part of a mobile phone related to a terminal according to some embodiments. Referring to FIG. 10, the mobile phone includes: a radio frequency (RF) circuit 1010, a memory 1020, an input unit 1030, a display unit 1040, a sensor 1050, an audio circuit 1060, a wireless fidelity (WiFi) module 1070, a processor 1080, and a power supply 1090. A person skilled in the art may understand that the mobile phone structure shown in FIG. 10 does not constitute a limitation to the mobile phone. The mobile phone may include more or fewer components than those shown in the figure, or may combine some components, or may have different component arrangements.

The following makes a detailed description of the components of the mobile phone with reference to FIG. 10:

The RF circuit 1010 may be configured to receive and send a signal in an information receiving and sending process or a call process, and in particular, after downlink information of a base station is received, send the downlink information to the processor 1080 for processing. In addition, the RF circuit transmits uplink data to the base station.

The memory 1020 may be configured to store a software program and module. The processor 1080 runs the software program and module stored in the memory 1020, to implement various functional applications and data processing of the mobile phone.

The input unit 1030 may be configured to receive inputted digit or character information, and generate a keyboard signal input related to the user setting and function control of the mobile phone. In some embodiments, the input unit 1030 may include a touch panel 1031 and other input device 1032.

The display unit 1040 may be configured to display information inputted by the user or information provided for the user, and various menus of the mobile phone. The display unit 1040 may include a display panel 1041.

The mobile phone may further include at least one sensor 1050 such as an optical sensor, a motion sensor, and other sensors.

The audio circuit 1060, a speaker 1061, and a microphone 1062 may provide audio interfaces between the user and the mobile phone.

The mobile phone further includes the power supply 1090 (such as a battery) for supplying power to the components.

Although not shown in the figure, the mobile phone may further include a camera, a Bluetooth module, and the like. Details are not described herein again.

In some embodiments, the processor 1080 included in the terminal device further has the following functions:

displaying a session list in response to a trigger operation on a voting entrance in a document editing tool;

displaying a chat window of a target group session in response to the determined target group session in the session list;

obtaining a plurality of to-be-parsed group session messages in the chat window; and generating a voting option based on the group session message, and posting a group voting including the voting option through the document editing tool.

In some embodiments, the processor 1080 included in the terminal further has the following functions:

determining a plurality of to-be-parsed group session messages in response to a message selection operation performed on a chat window of a target group session;

separately displaying, in response to a trigger operation for parsing the group session message, a plurality of pieces of obtained option information on each option position in a voting editing page, and generating a voting option, where the option information is obtained by parsing the to-be-parsed group session message; and posting, in response to a trigger operation on a posting control in the voting editing page, a group voting including the voting option in the target group session.

Some embodiments provide a computer-readable storage medium, configured to store a computer program, the computer program being configured to perform any implementation in the method for posting a group voting described in the foregoing embodiments.

Some embodiments provide a computer program product including a computer program, the computer program, when run on a computer, enabling the computer to perform any implementation in the method for posting a group voting described in the foregoing embodiments.

Persons skilled in the art may clearly understand that, for the purpose of convenient and brief description, for a detailed working process of the system and the device described above, refer to a corresponding process in the method embodiments, and details are not described herein again.

In some embodiments, it is to be understood that the disclosed system and method may be implemented in other manners. For example, the described system embodiment is merely an example. For example, the system division is merely logical function division and may be other division in actual implementation. For example, a plurality of systems may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The systems described as separate parts may or may not be physically separate. Parts displayed as units may or may not be physical units, and may be located in one position, or may be distributed on a plurality of network units. Some or all of the units may be selected based on actual requirements to achieve the objectives of the solutions of embodiments.

In addition, functional units in some embodiments may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions may be implemented in the form of a software product. The computer software product is stored in a storage medium and includes several instructions for instructing a computer device (which may be a personal computer, a server, or a network device) to perform all or some of the operations of the methods described in some embodiments. The storage medium includes: any medium that can store program code, such as a USB flash drive, a removable hard disk, a read-only memory (ROM), a random access memory (RAM), a magnetic disk, or an optical disk.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method for posting a group voting, performed by a computer device, comprising:
- displaying a session list based on a trigger operation on a voting entrance in a document editing tool;
- displaying a chat window of a target group session based on determining the target group session in the session list;
- obtaining a plurality of to-be-parsed group session messages in the chat window; and
- generating a voting option based on the group session message, and posting a group voting comprising the voting option through the document editing tool.

2. The method according to claim 1, wherein displaying the session list comprises:
- creating and displaying a voting editing page based on the trigger operation on the voting entrance, the voting editing page comprising a voting parameter setting item; and
- displaying the session list based on a trigger operation on a control for adding an option from a session in the voting parameter setting item.

3. The method according to claim 2, wherein generating the voting option comprises:
- obtaining a plurality of pieces of option information by parsing the group session message;
- generating the voting option by separately displaying the plurality of pieces of option information on each option position in the voting editing page; and
- posting the group voting comprising the voting option based on a trigger operation on a posting control in the voting editing page.

4. The method according to claim 3, wherein posting the group voting comprising the voting option comprises:
- generating, based on the trigger operation on the posting control, an open path of the group voting through the document editing tool; and
- posting, based on a trigger operation for sharing the open path, the group voting by sharing the open path.

5. The method according to claim 4, wherein posting the group voting by sharing the open path comprises:
- sharing the open path to the target group session; or
- sharing the open path to a custom path outside the target group session.

6. The method according to claim 5, wherein the target group session is a group session in an instant messaging application; and the custom path comprises one of the following:
- a group session other than the target group session in the instant messaging application, another social application, a network platform, or an address book of a terminal device.

7. The method according to claim 4, wherein the method further comprises:
- based on a user who triggers the open path being an authorized collaborative editing user, displaying a voting posting page of the group voting after the open path is triggered, the voting posting page comprising the voting option; and
- updating the voting posting page based on an editing operation on the voting option by the authorized collaborative editing user in the voting posting page.

8. The method according to claim 4, wherein the open path comprises:
- an identifier, a link, a hyperlink, or a storage address of the voting editing page.

9. The method according to claim 3, wherein parsing the group session message comprises:
- obtaining a hypertext markup language of the group session message;
- based on the hypertext markup language that a web page link in the group session message being a plain text web page link, parsing a picture in the plain text web page link through an image parsing technology, and using picture information obtained by parsing as information for generating the voting option; and
- based on the hypertext markup language that the web page link in the group session message being a web page link carrying a thumbnail image, using the thumbnail image as the information for generating the voting option.

10. The method according to claim 3, wherein a web page link in the group session message is a web page link in the target group session;
- a global variable of a web page is injected with a software development tool packet, wherein the software development tool packet is invoked based on the web page being initialized to provide the voting parameter setting item corresponding to the web page; and
- wherein the method further comprises:
- invoking the software development tool packet to generate the voting parameter setting item corresponding to the web page.

11. The method according to claim 10, wherein generating the voting option by separately displaying the plurality of pieces of option information on each option position in the voting editing page comprises:

generating a voting option by filling a web page title and an introduction picture corresponding to the web page into the voting editing page.

12. The method according to claim 1, wherein a meta tag corresponding to a web page link in the group session message is configured to: state that the web page link is allowed to be parsed after the web page link is shared.

13. The method according to claim 1, wherein before the posting a group voting comprising the voting option through the document editing tool, the method further comprises:

obtaining at least one of description information and title information by parsing the group session message;

based on a description option being obtained, generating a voting description by displaying the description information at a voting description position of the voting editing page; and based on a title option being obtained, generating a voting title by displaying the title information at a title position of the voting editing page.

14. The method according to claim 1, wherein the plurality of to-be-parsed group session messages comprise messages in at least two forms of a text, a picture, a video, or a web page link.

15. An apparatus for posting a group voting, comprising:

at least one memory configured to store program code; and at least one processor configured to read the program code and operate as instructed by the program code, the program code comprising:

session list display code configured to cause at least of the at least one processor to display a session list based on a trigger operation on a voting entrance in a document editing tool;

chat window display code configured to cause at least of the at least one processor to display a chat window of a target group session based on determining the target group session in the session list;

message obtaining code configured to cause at least of the at least one processor to obtain a plurality of to-be-parsed group session messages in the chat window;

voting option generation code configured to cause at least of the at least one processor to generate a voting option based on the group session message; and voting posting code configured to cause at least of the at least one processor to post a group voting comprising the voting option through the document editing tool.

16. The apparatus according to claim 15, wherein the session list display code is further configured to cause at least one of the at least one processor to:

create and display a voting editing page based on the trigger operation on the voting entrance, the voting editing page comprising a voting parameter setting item; and display the session list based on a trigger operation on a control for adding an option from a session in the voting parameter setting item.

17. The apparatus according to claim 16, wherein the voting option generation code is further configured to cause at least one of the at least one processor to:

obtain a plurality of pieces of option information by parsing the group session message;

generate the voting option by separately displaying the plurality of pieces of option information on each option position in the voting editing page; and post the group voting comprising the voting option based on a trigger operation on a posting control in the voting editing page.

18. The apparatus according to claim 17, wherein the voting posting code is further configured to cause at least one of the at least one processor to:

generate, based on the trigger operation on the posting control, an open path of the group voting through the document editing tool; and post, based on a trigger operation for sharing the open path, the group voting by sharing the open path.

19. The apparatus according to claim 18, wherein the voting posting code is further configured to cause at least one of the at least one processor to:

share the open path to the target group session; or share the open path to a custom path outside the target group session.

20. A non-transitory computer-readable storage medium storing computer code which, when executed by at least one processor, causes the at least one processor to at least:

display a session list based on a trigger operation on a voting entrance in a document editing tool;

display a chat window of a target group session based on determining the target group session in the session list;

obtain a plurality of to-be-parsed group session messages in the chat window; and generate a voting option based on the group session message, and post a group voting comprising the voting option through the document editing tool.

* * * * *